United States Patent [19]

Horiuchi et al.

[11] 4,388,573
[45] Jun. 14, 1983

[54] ELECTRIC VEHICLE CONTROL DEVICE

[75] Inventors: Michimasa Horiuchi; Masahiko Ibamoto, both of Katsuta; Kiyoshi Nemoto, Ibaraki, all of Japan

[73] Assignee: Hitachi, Ltd., Tokyo, Japan

[21] Appl. No.: 254,295

[22] Filed: Apr. 15, 1981

[30] Foreign Application Priority Data

Apr. 16, 1980 [JP] Japan ................... 55-49187

[51] Int. Cl.³ .............................. H02P 3/14
[52] U.S. Cl. .................... 318/376; 318/139; 318/258; 318/269
[58] Field of Search .............. 318/139, 258, 269, 273, 318/341, 376

[56] References Cited

U.S. PATENT DOCUMENTS

| | | | |
|---|---|---|---|
| 3,630,304 | 12/1971 | Sahinkaya | 318/376 X |
| 3,793,578 | 2/1974 | Rettig | 318/376 X |
| 3,936,709 | 2/1976 | Wright | 318/269 |
| 4,162,436 | 7/1979 | Waldorf et al. | 318/139 |
| 4,284,930 | 8/1981 | Matty | 318/269 |

Primary Examiner—J. V. Truhe
Assistant Examiner—W. E. Duncanson, Jr.
Attorney, Agent, or Firm—Antonelli, Terry & Wands

[57] ABSTRACT

An electric vehicle control device is disclosed which includes a main circuit for supplying power from a d.c. power supply to a driving motor through a chopper, a phase shifter for controlling the conduction ratio of the chopper in such a manner that a current flowing through the driving motor is proportional to an instruction value determined by how much an accelerator pedal is trodden, a circuit for instructing a regenerative braking operation, and a changeover switch for changing over the main circuit between a power running state and a regenerative braking state. The changeover switch is changed over in the regenerative braking state when another power running state in the direction opposite to the current running direction is instructed in a predetermined time after the stop of a power running state where the chopper had a conduction ratio greater than a preset value.

4 Claims, 7 Drawing Figures

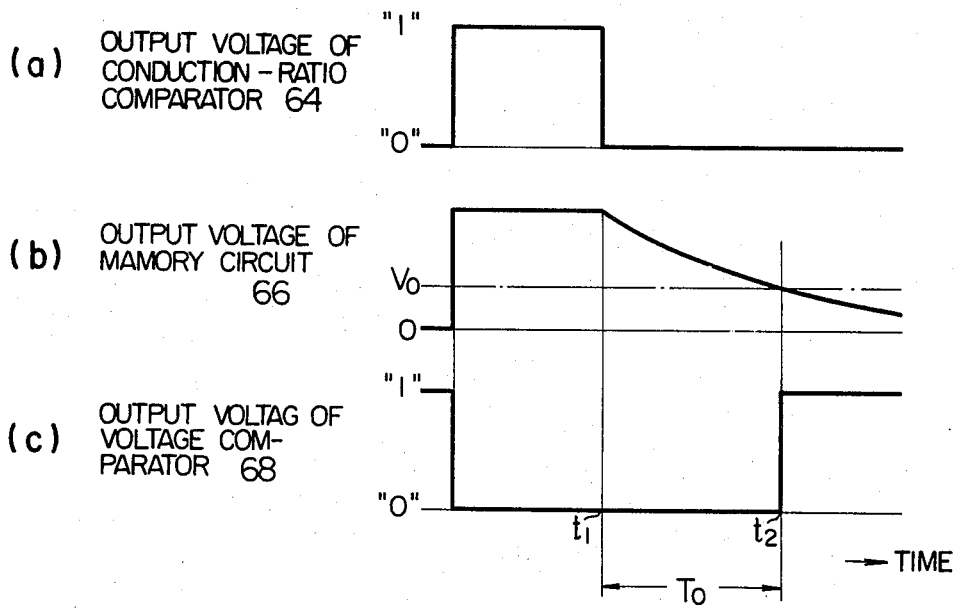
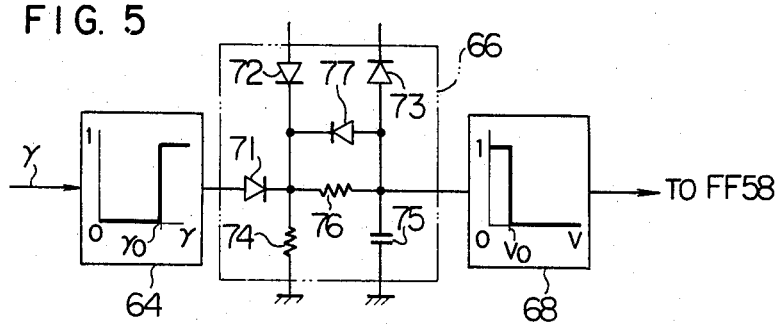

ELECTRIC VEHICLE CONTROL DEVICE

The present invention relates to an electric vehicle control device, and more particularly to an electric vehicle control device suitable for use in the case where the electric braking and the regenerative braking are conducted for the driving motor of a forklift driven by a battery.

A d.c. series motor control using a thyristor chopper is generally employed for battery forklifts, and the electric braking for the d.c. series motor is usually carried out in the form of the reversed braking, that is, the so-called plugging is conducted. This is because any change is not required in the circuit connection of a main circuit including the battery and the motor when the electric braking is carried out, and because the reversed operation can be conducted immediately after the electric braking has been completed without any intervening operation therebetween. In the plugging, however, the entire brake energy is converted into heat by the internal resistance of motor armature, and therefore the braking efficiency is low. Further, the insulation in the motor is deteriorated by a large amount of heat generated in the motor armature, and therefore it is required to provide a device for cooling the motor, which device makes the motor expensive. In order to solve the above difficulties, the use of a regenerative brake, which can regenerate the brake energy in the battery, attracts public attention.

Unlike the plugging, the circuit connection of the main circuit has to be changed in the case where the regenerative braking is employed. Further, in order to conduct the regenerative braking, the motor is required to have a rotating speed which is higher than a predetermined value. Accordingly, in a railway vehicle and others, when a power running state is changed over to the regenerative braking state, a mechanical brake is automatically operated at such a rotating speed of motor as making the regenerative braking impossible.

On the other hand, the battery forklift takes a coasting state, when the power running state is changed over to the regenerative braking state and the regenerative brake does not operate. Accordingly, the battery forklift involves a risk that a crash may occur in the coasting state before the driver treads the foot brake pedal to operate a mechanical brake. For this reason, in the forklift driven by the battery, it is required that the main circuit is changed over to the regenerative braking circuit connection only in such a driving state of motor as the regenerative braking can be surely conducted. As a general method for realizing the above requirement, there is known such a method as detecting the rotating speed of motor by a revolution indicator and then changing the main circuit over to the regenerative braking connection on the basis of the detected value. Such a method, however, has drawbacks that the revolution indicator is expensive and the maintenance thereof is difficult.

An object of the present invention is to eliminate the above-mentioned drawbacks of the conventional electric vehicle control device.

Another object of the present invention is to provide an electric vehicle control device which is simple in circuit configuration and inexpensive, and in which a regenerative braking circuit is formed only in a driving state of motor that the regenerative braking can be conducted.

A main feature of the present invention resides in that a regenerative braking circuit is formed when a power running state such as a chopper has a conduction ratio greater than a preset value is stopped and another power running state in the direction opposite to the above power running direction is instructed in a predetermined time.

According to one aspect of the present invention, there is provided an electric vehicle control device comprising:

a main circuit for supplying power from a d.c. power supply to a driving motor through a chopper;

a phase shifter for controlling the conduction ratio of said chopper in such a manner that a current flowing through said driving motor is proportional to an instruction value, said instruction value being determined by how much an accelerator pedal is trodden;

means for instructing a regenerative braking operation;

changeover means for changing over said main circuit between a power running state and a regenerative braking state;

conduction-ratio detecting means for detecting that the conduction ratio of said chopper in said power running state exceeds a preset value, to deliver an output while the conduction ratio exceeds the preset value;

holding means for holding and delivering said output of said conduction-ratio detecting means for a predetermined time; and means for placing said changeover means on the regenerative braking side in response to the presence of both of the output of said holding means and the output of said means for instructing said regenerative braking operation.

The objects, features and advantages of the present invention will be more clear from the following description with reference to the accompanying drawings, in which:

FIG. 3 is a logical table showing the operation of the flip-flop 58 included in the regenerative brake control circuit;

FIG. 4 is a waveform chart showing the operations of several parts of the regenerative brake control circuit;

FIG. 5 is a circuit diagram showing a part of another example of the regenerative brake control circuit;

Now, the present invention will be explained below in detail with reference to the drawings.

Figure 1:
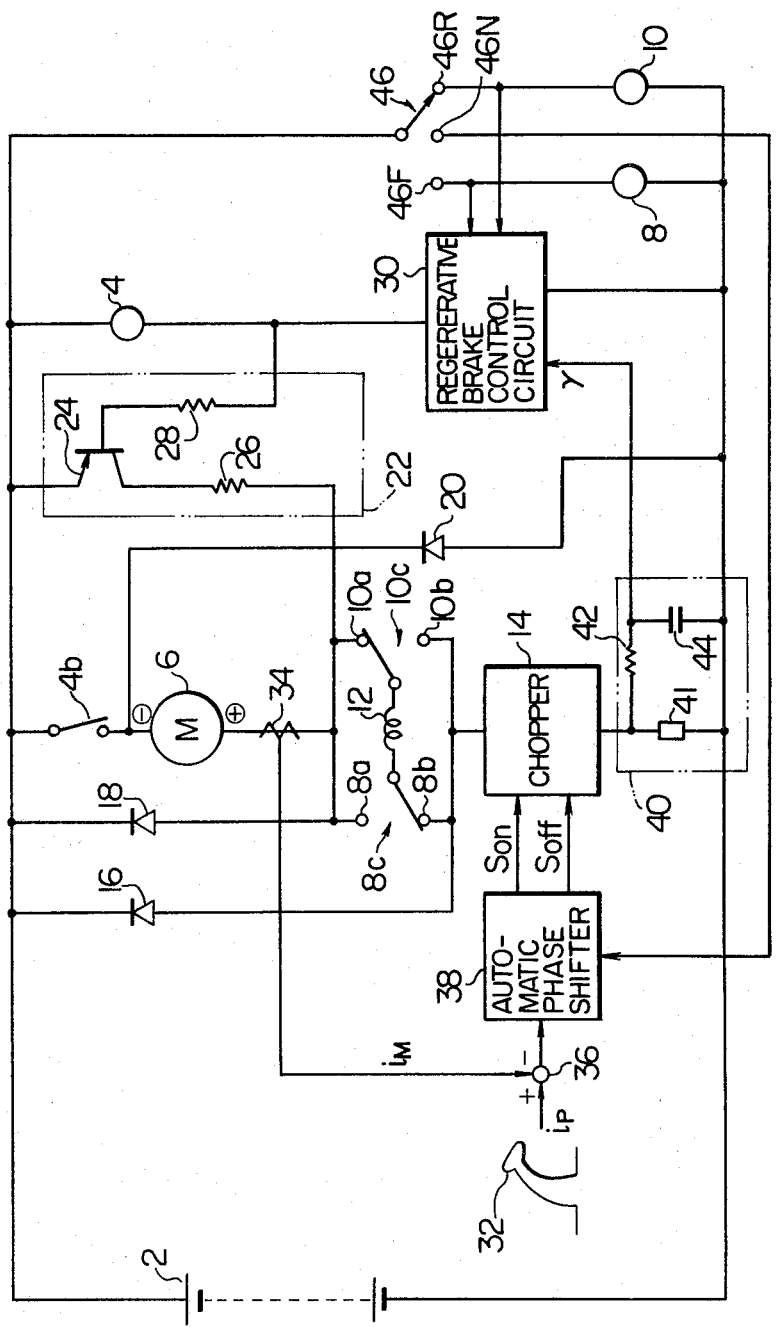
FIG. 1 is a block diagram showing an embodiment of an electric vehicle control device according to the present invention.

FIG. 1 is a block diagram showing a preferred embodiment of an electric vehicle control circuit according to the present invention. Referring to FIG. 1, a battery 2, a normally-closed relay contactor 4b for conducting the changeover between the power running state and the regenerative braking state, a motor armature 6, a field coil 12 (of motor) having at both ends thereof a relay contactor 8C for forward motion and a relay contactor 10C for backward motion, and a chopper 14 are connected in series. The relay contactor 4b is made open by energizing a relay coil 4, when the regenerative braking is conducted. A diode 16 is a flywheel diode for causing a motor current $i_M$ to circulate when the chopper 14 is nonconductive. A diode 18 is a plugging diode for conducting the plugging to operate an electric brake when the relay contactor 4b is kept at the closed state. Further, a diode 20 is used to form a regenerative braking circuit when the contactor 4b is kept open. A circuit 22 is a pre-exciting circuit for passing an electric current through the field coil 12 to previously generate an induced voltage in the motor armature 6, when the regenerative braking is conducted. The pre-exciting circuit 22 includes a switching element, for example, a PNP transistor 24, the emitter of which is connected to one end terminal of the battery 2. The collector of the transistor 24 is connected to the relay contactor 8C or 10C through a resistor 26, and the base of the transistor 24 is connected to a regenerative brake control circuit 30 through a resistor 28. Both the pre-exciting circuit 22 and the relay coil 4 are controlled by the regenerative brake control circuit 30. Further, a difference between a motor current $i_M$ obtained by a motor current detector 34 and a speed instruction $i_p$ which depends upon the state of an accelerator pedal provided at the driver's cab, is obtained by a subtractor 36, and is applied to an automatic phase shifter 38. The automatic phase shifter 38 supplies the chopper 14 with an ON signal $S_{on}$ and an OFF signal $S_{off}$ in accordance with the above-mentioned difference. Thus, the conduction ratio of the chopper 14 can be controlled so that the motor current $i_M$ follows the speed instruction $i_p$, not only in the case where the relay contactor 4b is kept in the closed state and the forward or backward power running operation or the conventional plugging operation for electric braking is conducted, but also in the case where the relay contactor 4b is kept in the open state and the regenerative braking is conducted.

A shunt resistor 41, a smoothing resistor 42 and a smoothing capacitor 44 make up a conduction-ratio detector 40 for detecting the conduction ratio $\gamma$ of the chopper 14. The output current from the chopper 14 flows through the shunt resistor 41, and the terminal voltage of the resistor 41 is smoothed by the resistor 42 and the capacitor 44 to form a conduction-ratio indicating voltage, which is applied to the regenerative brake control circuit 30.

One of the forward and backward motions in the power running operation is selected by a selection lever 46. In more detail, a relay coil 8 or a relay coil 10 is energized according as the movable contact of the lever 46 is brought into contact with a terminal 46F for forward motion or a terminal 46R for backward motion. Thus, the movable contact of the relay contactor 8C or 10C is brought into contact with a terminal 8a or 10a to make the forward or backward motion. When the relay coils 8 and 10 are not energized, the movable contact of the contactor 8C and that of the contactor 10C are kept in contact with a terminal 8b and a terminal 10b, respectively. When the movable contact of the lever 46 is brought into contact with a neutral terminal 46N, a signal is applied to the automatic phase shifter 38 to suppress the output thereof, thereby making the conduction ratio of the chopper 14 equal to zero.

Figure 2:
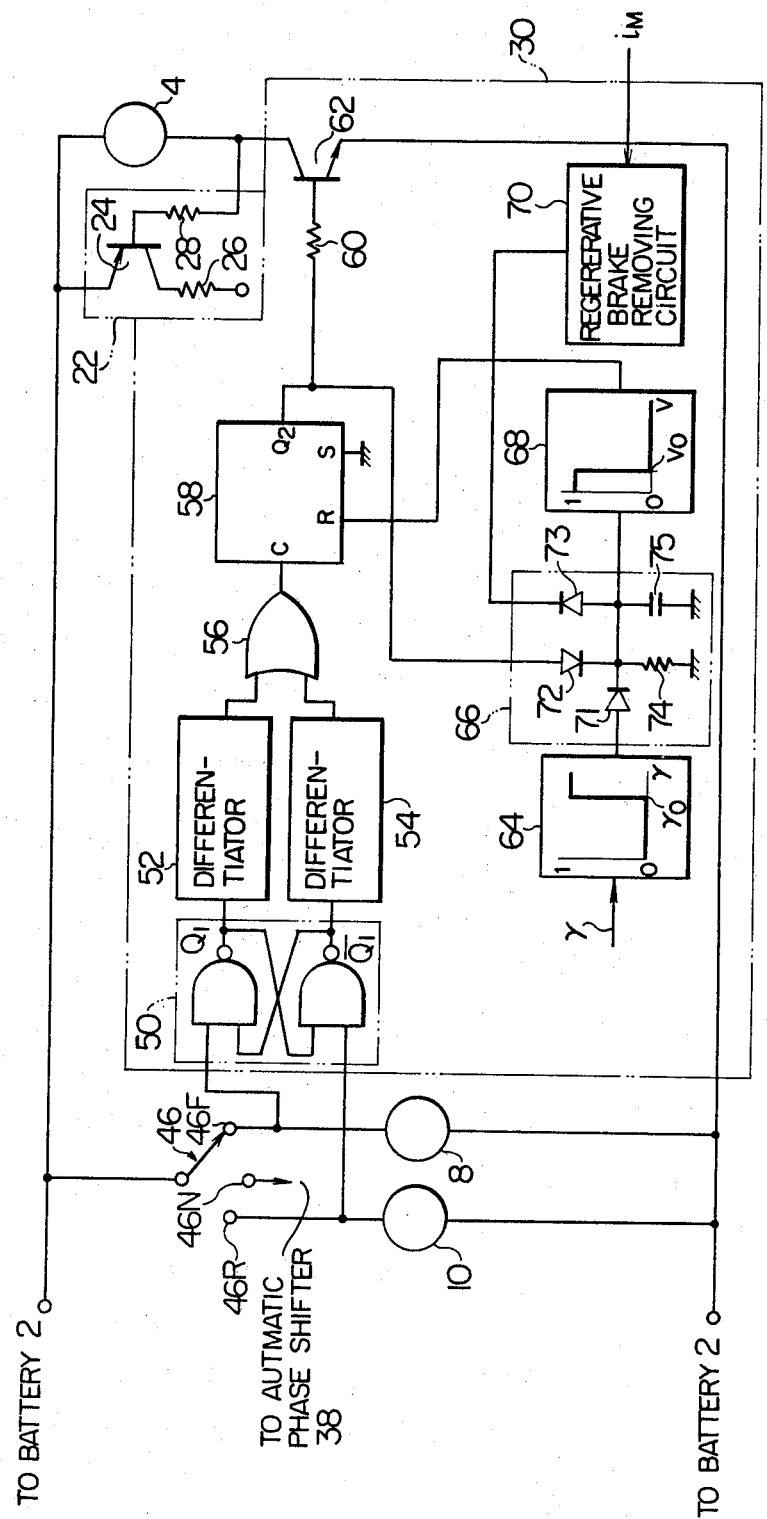
FIG. 2 is a block diagram showing an example of the regenerative brake control circuit shown in FIG. 1.

FIG. 2 shows the circuit configuration of an example of the regenerative brake control circuit 30 shown in FIG. 1. Referring to FIG. 2, two inputs of a flip-flop 50 are connected to the terminal 46F for forward motion and the terminal 46R for backward motion, respectively, and the Q output and $\overline{Q}$ output of the flip-flop 50 are connected to an OR circuit 56 through differentiating circuits 52 and 54, respectively. The output of the OR circuit 56 is applied to a clock terminal C of a flip-flop 58. These circuit elements 50, 52, 54, 56 and 58 can detect that the moving direction has been reversed. In more detail, the flip-flop 50 is operated in accordance with the state of the movable contact of the selection lever 46 and delivers an output pulse. The output pulse from the flip-flop 50 is differentiated at its rising edge by the differentiating circuit 52 or 54, and then applied as a clock signal to the flip-flop 58 through the OR circuit 56. The output pulse from a $Q_2$ terminal of the flip-flop 58 is applied to the base of a transistor 62 for passing exciting currents through the pre-exciting circuit 22 and relay coil 4.

On the other hand, the output signal from the conduction-ratio detector 40 is applied to a conduction-ratio comparator 64. The comparator 64 delivers a high-level signal when the conduction ratio $\gamma$ of the chopper 54 exceeds a preset value $\gamma_o$, and the output signal from the comparator 64 is applied to a voltage comparator 68 through a memory circuit 66, which is made up of diodes 71, 72 and 73, a resistor 74 and a capacitor 75. The voltage comparator 68 delivers a high-level or low-level signal according as the input voltage thereof is less than or more than a preset voltage $V_o$. The output signal from the voltage comparator 68 is used as the reset signal of the flip-flop 58.

Further, reference numeral 70 designates a regenerative brake removing circuit for removing the regenerative brake control. The regenerative brake removing circuit 70 delivers a high-level signal in an ordinary case, but delivers a low-level signal only when the regenerative brake control is removed. The circuit 70 responds to, for example, the motor current $i_M$ from the motor current detector 34. The output terminal of the regenerative brake removing circuit 70 is connected through the diode 73 to the resistor 74 and the capacitor 75. Further, the set terminal S of the flip-flop 58 is grounded, and the $Q_2$ terminal of the flip-flop 58 is connected to the capacitor 75 through the diode 72.

Now, explanation will be made on the operation of the circuits shown in FIGS. 1 and 2, at a time when the battery forklift is brought from a power running state to a regenerative braking state.

When the movable contact of the lever 46 is moved from the terminal 46N to the terminal 46F in the state that the forklift stops, the relay coil 8 is excited and the movable contact of the relay contactor 8C for forward motion (shown in FIG. 1) makes contact with the terminal 8a. At this time, the movable contact of the contactor 10C is kept in contact with the terminal 10b. Then, the accelerator pedal 32 is trodden, and therefore the difference between the speed instruction $i_p$ and the motor current $i_M$ is applied to the automatic phase shifter 38. Thus, the chopper 14 is operated and the forklift is put in the forward power running state. Further, the output current from the battery 2 flows into the chopper 14 through the relay contactor 4b, motor armature 6, relay contactor 8C for forward motion, field coil 12 and relay contactor 10C for backward motion. The amount of the above-mentioned current is controlled by the chopper 14.

When the relay coil 8 is excited, the flip-flop 50 is operated and delivers from the output terminal $Q_1$ thereof a high-level signal (having the level of "1"). This high-level signal is differentiated by the differentiating circuit 52, and the output pulse from the circuit 52 is applied as the clock signal to the clock terminal C of the flip-flop 58 through the OR circuit 56.

At the time when the relay coil 8 has been just excited, the conduction ratio $\gamma$ of the chopper 14 is smaller than the value $\gamma_o$ preset in the conduction-ratio comparator 64 and therefore the comparator 64 delivers a low-level signal (having the level of "0"). Accordingly, the output voltage of the memory circuit 66, that is, the terminal voltage of the capacitor 75 takes the level of "0," and thus the voltage comparator 68 sends a high-level signal to the reset terminal R of the flip-flop 58.

Incidentally, the operation of the flip-flop 58 is shown by the truth table shown in FIG. 3. Referring to FIG. 3, when the signal applied to the reset terminal R has the level of "1," the $Q_2$ output takes the level of "1" in response to the rising edge of the clock signal, and is left as it is for the falling edge of the clock signal. Further, when the signal applied to the reset terminal R has the level of "1," the $Q_2$ output takes the level of "0" independently of the clock signal.

Accordingly, in the above-mentioned case where the conduction ratio $\gamma$ of the chopper 14 is smaller than the preset value $\gamma_o$, the $Q_2$ output of the flip-flop 58 takes the level of "0," and the base of the transistor 62 is applied with no gate signal. Therefore, the transistor 62 is nonconductive, and the output of the regenerative brake control circuit 30 takes a low level. Accordingly, the relay coil 4 and the pre-exciting circuit 22 are not energized. Thus, the relay contactor 4b is kept in the closed state and the transistor 24 is put in the OFF state.

In the above-mentioned forward power running state, the rotating speed of motor becomes high in accordance with how much the accelerator pedal 32 is trodden, and the conduction ratio $\gamma$ of the chopper 14 becombs larger and larger. When the conduction ratio $\gamma$ exceeds the preset value $\gamma_o$, the conduction-ratio comparator 64 delivers a high-level signal.

FIG. 4 is a waveform chart for showing signal waveforms in several parts of the regenerative brake control circuit 30. In FIG. 4, reference symbols (a), (b) and (c) shows the output voltage of the conduction-ratio comparator 64, the output voltage of the memory circuit 66 (that is, the terminal voltage of the parallel combination of the resistor 74 and capacitor 75) and the output voltage of the voltage comparator 68, respectively. FIG. 4 shows that the output of the voltage comparator 68 takes a low level when the output of the conduction-ratio comparator 64 takes a high level. This is because the capacitor 75 of the memory circuit 66 charges up so that the terminal voltage V of the capacitor 75 exceeds the preset value $V_o$. As mentioned previously, the regenerative brake removing circuit 70 delivers the low-level signal only when the regenerative brake is removed, and delivers the high-level signal in all other states. Accordingly, the diode 73 of the memory circuit 66 is reverse-biased. Thus, electric charges on the capacitor 75 are maintained without being discharged through the diode 73, and therefore the voltage comparator 68 sends the low-level signal to the reset terminal R of the flip-flop 58.

Next, let us consider the case where the forward power running state is changed over to the backward power running state. When the movable contact of the selection lever 46 is moved from the terminal 46F to the terminal 46R through the neutral terminal 46N, the relay coil 10 is excited. In more detail, when the movable contact of the lever 46 is changed over from the terminal 46F to the terminal 46N, the relay coil 8 is de-energized, and the movable contact of the relay contactor 8C is brought into contact with the terminal 8b. The chopper 14 becomes inoperative when the movable contact of the lever 46 makes contact with the neutral terminal 46N, and the following changeover operation is performed. Referring to FIG. 4, at a time $t_1$ when the movable contact of the lever 46 is brought into contact with the terminal 46N, the chopper 14 becomes inoperative and the conduction ratio $\gamma$ becomes equal to zero. Thus, the output of the conduction-ratio comparator 64 takes a low level, as shown in FIG. 4(a). Therefore, the terminal voltage of the resistor 74, as shown in FIG. 4(b), is decreased in accordance with a time constant which is determined by the resistor 74 and capacitor 75, and becomes equal to the preset voltage $V_o$ at a time $t_2$. In other words, in the period $T_o$ from the time $t_1$ to the time $t_2$, the output of the voltage comparator 68 takes the low level, and therefore the reset terminal R of the flip-flop 58 is maintained at the low voltage level.

If the movable contact of the lever 46 is changed over from the neutral terminal 46N to the terminal 46R at a time $t_2$ within the period $T_o$, the relay coil 10 is energized and the movable contact of the relay contactor 10C is brought into contact with the terminal 10a. Simultaneously, the flip-flop 50 delivers a high-level signal from its output terminal $\overline{Q_1}$, and delivers a low-level signal from another output terminal $Q_1$. The high-level signal from the terminal $\overline{Q_1}$ is differentiated at the rising edge thereof by the differentiating circuit 54. The output pulse from the circuit 54 is applied as the clock pulse to the flip-flop 58 through the OR circuit 56. As is apparent from the truth table shown in FIG. 3, the output of the flip-flop 58 takes the high level. Thus, a base current flows into the transistor 62, and therefore the transistor 62 becomes conductive. Accordingly, the relay coil 4 is exited, and the relay contactor 4b for conducting the changeover between the power running state and the regenerative braking state is made open. That is, a regenerative braking circuit is formed. Simultaneously, the transistor 24 becomes conductive and the pre-exciting circuit 22 can operate.

Further, the output of the flip-flop 58 is applied through the diode 72 to the resistor 74 and capacitor 75. Accordingly, the output of the memory circuit 66 is increased and maintained at the high level. Thus, the output of the voltage comparator 68 is kept at the low level and the reset terminal R of the flip-flop 58 is maintained at the low voltage level.

Now, explanation will be made, with reference to FIG. 1, on the regenerative brake control in the case where the chopper 14 is again operated in accordance with the state of the accelerator pedal 32 in the state that the motor is put in the forward power running state, that the relay contactor 4b is made open, that the movable contact of the contactor 10C is brought into contact with the terminal 10a, and that the pre-exciting circuit 22 can operate. When the chopper 14 is conductive, a field current from the battery 2 flows through the transistor 24, resistor 26, relay contactor 10C, field coil 12, relay contactor 8C and chopper 14, in the order described, and an induced voltage is generated across the motor armature 6. The polarity of the induced voltage is positive on the lower side (in FIG. 1) of the motor armature 6, and is negative on the upper side. The induced voltage causes an electric current to flow from the positive side of the motor armature 6 to the negative side thereof through the shunt resistor 34, relay contactor 10C, field coil 12, relay contactor 8C, chopper 14 and diode 20, so that the current flowing through the field coil 12 is increased. That is, the self-exciting action is generated.

When the induced voltage becomes high and the current is more increased, the current can flow by only the self-exciting action. Then, the motor becomes a self-excited generator, and a motor current flows through a closed circuit having a current path of motor armature 6→relay contactor 10C→field coil 12→relay contactor 8C→chopper 14→diode 20→motor armature 6, when the chopper 14 is conductive. When the chopper 14 becomes non-conductive in the above-mentioned state, the induced voltage across the motor armature 6 and the magnetic energy stored in the field coil 12 cause a motor current to flow through a circuit having a current path of the positive side of armature 6→shunt resistor 34→relay contactor 10C→field coil 12→relay contactor 8C→flywheel diode 16→battery 2→diode 20→the negative side of armature. Thus, electric power is regenerated in the battery 2, the so-called regenerative braking is conducted, and the rotating speed of motor is thereby reduced.

When the rotating speed of motor is reduced due to the regenerative braking and becomes equal to a value at which the regenerative braking cannot be conducted, the output of the regenerative brake removing circuit 30 takes a low level. As a result, electric charges on the capacitor 75 are rapidly discharged through the diode 73, and the terminal voltage of the resistor 74 becomes equal to zero. Accordingly, the output of the voltage comparator 68 takes a high level, and a high-level signal is applied to the reset terminal R of the flip-flop 58. Thus, as is apparent from the truth table shown in FIG. 3, the $Q_2$ output of the flip-flop 58 takes the level of "0." The transistor 62 becomes nonconductive, the preexciting circuit 22 becomes inoperative, and the relay coil 4 is de-energized. Accordingly, the relay contactor 4b for conducting the changeover between the power running state and the regenerative braking state is brought into the closed state, and the regenerative braking is prevented.

At this time, the motor does not stop but runs slow in such a direction as giving the forklift the forward motion, and the plugging state is maintained till the motor stops. In more detail, when the chopper is conductive, a field current and a motor (armature) current from the battery 2 flows through the relay contactor 4b, armature 6, relay contactor 10C, field coil 12, relay contactor 8C and chopper 14 to the battery 12. When the chopper is nonconductive, a field current flows from the positive side of the armature 6 to the negative side thereof through the plugging diode 18 and the relay contactor 4b, while an armature current from the field coil 12 flows through the relay contactor 8C, flywheel diode 16, plugging diode 18 (when an armature current is larger than a field current, a current flows reversely through the diode 18 in appearance to decrease a current therethrough) and relay contactor 10C to the field coil thereby to effect a regenerative braking operation, i.e. a plugging operation.

Thus, the motor is stopped, and then the forklift is put in the backward power running state.

When the rotating speed of motor is decreased due to the regenerative braking, the conduction ratio $\gamma$ of the chopper 14 finally reaches a maximum value and the motor current $i_M$ becomes smaller than the speed instruction $i_p$. Accordingly, an example of the regenerative brake removing circuit 70 can be formed in such a manner as detecting that the motor current $i_M$ has become smaller than a predetermined value at which the regenerative braking cannot be conducted, and outputting a low-level signal in response to the above-mentioned detection.

Further, in another example, the circuit 70 may output the low-level signal on detecting that the conduction ratio of the chopper has reached a predetermined value.

In the foregoing description, explanation has been made on the case where the forward power running state is changed over to the backward power running state. A similar operation is performed in the case where the backward power running state is changed over to the forward power running state, and therefore explanation of the latter case is omitted.

According to the above-mentioned embodiment, the regenerative braking circuit can be formed only in the running state of motor that the regenerative braking can be surely conducted.

FIG. 5 shows a part of another example of the regenerative brake control circuit. The part shown in FIG. 5 differs from that shown in FIG. 2 in that the memory circuit 66 further includes a resistor 76 and a diode 77. According to the circuit configuration shown in FIG. 5, the input of the voltage comparator 68 has a time constant, which is determined by the capacitor 75 and resistor 76, for the rising edge of the output pulse from the conduction-ratio comparator 64.

Since battery forklifts are different in specification from each other in accordance with the type thereof, in a battery forklift of some sort, even if the regenerative braking circuit is formed, it may well be that the regenerative braking will not be conducted at the number of turns which the motor makes immediately after the conduction ratio $\gamma$ of the chopper in the power running state has exceeded the preset value $\gamma_o$. According to the circuit configuration shown in FIG. 5, the output voltage V of the memory circuit 66 reaches the voltage $V_o$ preset in the voltage comparator 68 when a predetermined time has elapsed after the conduction ratio $\gamma$ of the chopper exceeded the preset value $\gamma_o$, and therefore the regenerative braking circuit is formed after the number of turns has become greater than that which the motor makes when the conduction ratio $\gamma$ reaches the value $\gamma_o$. The diode 77 forms a discharging path for electric charges on the capacitor 75. However, like the memory circuit shown in FIG. 2, the time constant of discharge is determined by the resistor 74 and capacitor 75. In other words, the memory circuit shown in FIG. 5 is different only in charging time constant from the memory circuit shown in FIG. 2.

According to the circuit configuration shown in FIG. 5, the regenerative braking circuit can be formed only when the regenerative braking can be more surely conducted.

Figure 6:
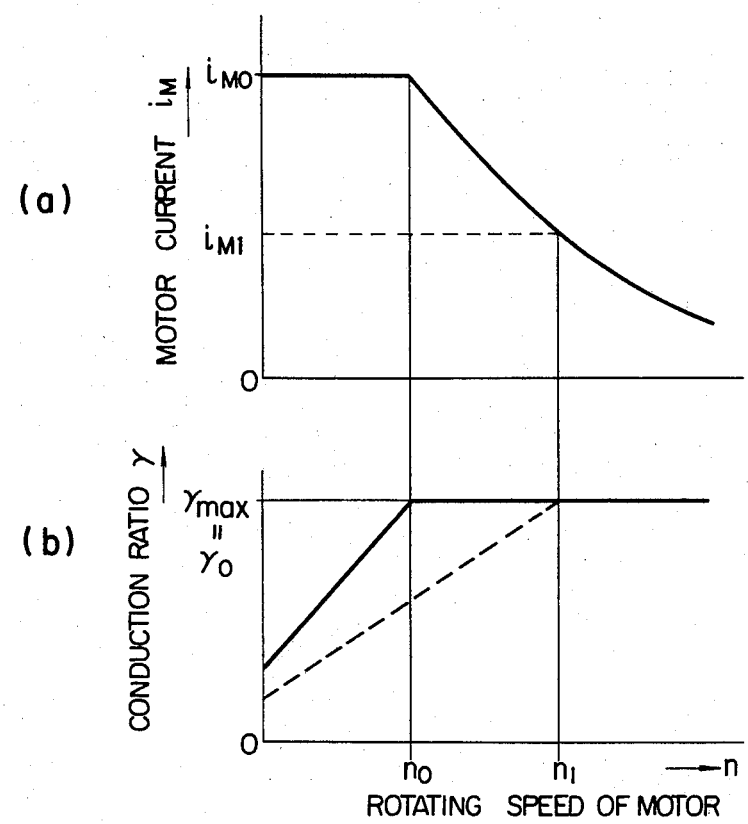
FIG. 6 is a graph showing a relation between the motor current and the rotating speed of motor and a relation between the conduction ratio of chopper and the rotating speed of motor.
Figure 7:
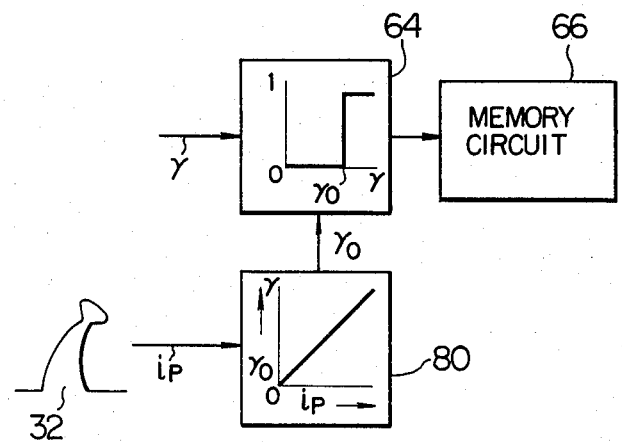
FIG. 7 is a block diagram showing a part of a further example of the regenerative brake control circuit.

The automatic phase shifter 38 shown in FIG. 1 is a current control circuit for controlling the motor current $i_M$ in such a manner that the current $i_M$ is made proportional to how much the accelerator pedal 32 is trodden. Accordingly, the number of turns which the motor makes when the conduction ratio $\gamma$ of the chopper 14 reaches the preset value $\gamma_o$, varies with the state of the accelerator pedal 32. FIG. 6 shows a relation between the motor current $i_M$ and the number n of turns and a relation between the conduction ratio $\gamma$ and the number n of turns, in the case where the preset value $\gamma_o$ is made equal to the maximum value of the conduction ratio $\gamma$. Referring to FIG. 6, in the case where the accelerator pedal is trodden so that the motor current $i_M$ is made equal to a value $i_{M0}$, the number n of turns which the motor makes when the conduction ratio $\gamma$ of the chopper has reached the value $\gamma_o$, is equal to a value $n_o$, as indicated by a solid line in FIG. 6. Further, in the case where the accelerator pedal is trodden so that the motor current $i_M$ is made equal to a value $i_{M1}$, the number n of turns at the time when the conduction ratio $\gamma$ has reached the value $\gamma_o$ is equal to a value $n_1$, as indicated by a broken line in FIG. 6. That is, though the regenerative braking can be conducted at the number $n_o$ of turns in some cases, the above braking cannot be conducted till the number n of turns reaches the value $n_1$ in the case where the motor current $i_M$ is so controlled as to be made equal to the value $i_{M1}$. In this case, the efficiency of the regenerative braking is lowered. In order to solve the above problem, as shown in FIG. 7, a set-conduction-ratio converter 80 is added to the regenerative brake control circuit shown in FIG. 2. According to the circuit configuration shown in FIG. 7, the value $\gamma_o$ set in the conduction-ratio comparator 64 varies with the speed instruction $i_p$, which is determined by how much the accelerator pedal 32 is trodden, in accordance with a predetermined functional relation. That is, when the number of turns which the motor makes, reaches the predetermined value $n_o$, the output of the conduction-ratio comparator 64 takes a high level independently of how much the accelerator pedal is trodden, and the regenerative braking can be conducted. In other words, by using the circuit shown in FIG. 7, the regenerative braking circuit can be formed in a wider range of the number of turns independently of the state of the accelerator pedal.

As is apparent from the foregoing description, according to the present invention, there is provided an electric vehicle control device which is simple in structure and inexpensive, and in which the regenerative braking circuit can be formed only in the running state of motor that the regenerative braking can be conducted.

Needless to say, the present invention is also applicable to electric vehicles other than the battery forklift.

In the above-mentioned embodiment, the flip-flop 58 is applied with the clock signal by changing over the movable contact of the selection lever 46. However, the clock signal may be manually applied to the flip-flop 58, using a separate switch, in order to conduct the regenerative braking.

What is claimed is:

1. An electric vehicle control device comprising:
    a main circuit for supplying power from a d.c. power supply to a driving motor through a chopper;
    a phase shifter for controlling the conduction ratio of said chopper in such a manner that a current flowing through said driving motor is proportional to an instruction value, said instruction value being determined by how much an accelerator pedal is trodden;
    means for instructing a regenerative braking operation;
    changeover means for changing over said main circuit between a power running state and a regenerative braking state;
    conduction-ratio detecting means for detecting that the conduction ratio of said chopper in said power running state exceeds a preset value, to deliver an output while the conduction ratio exceeds the preset value;
    holding means for holding and delivering said output of said conduction-ratio detecting means for a predetermined time; and
    means for placing said changeover means on the regenerative braking side in response to the presence of both of the output of said holding means and the output of said means for instructing said regenerative braking operation.

2. An electric vehicle control device according to claim 1, wherein said means for instructing said regenerative braking operation includes a selector for selecting one of a forward power running state and a backward power running state, and means responsive to the reversal of the moving direction of an electric vehicle by said selector for delivering a regenerative braking instruction.

3. An electric vehicle control device according to claim 1, wherein said holding means outputs the contents held therein when a predetermined time has elapsed after the conduction ratio of said chopper in said power running state reached said preset value.

4. An electric vehicle control device according to claim 1, further comprises means for making said preset value in said conduction-ratio detecting means vary with said instruction value determined by how much said accelerator pedal is trodden.

* * * * *